No. 51,656. A. W. JONES. PATENTED DEC. 19, 1865.
SLIDE VALVE FOR STEAM ENGINES.
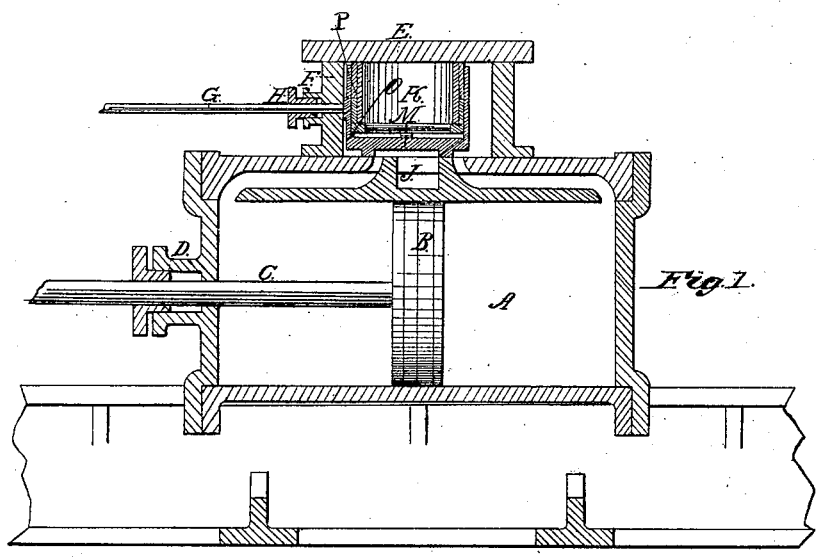
Fig. 1.
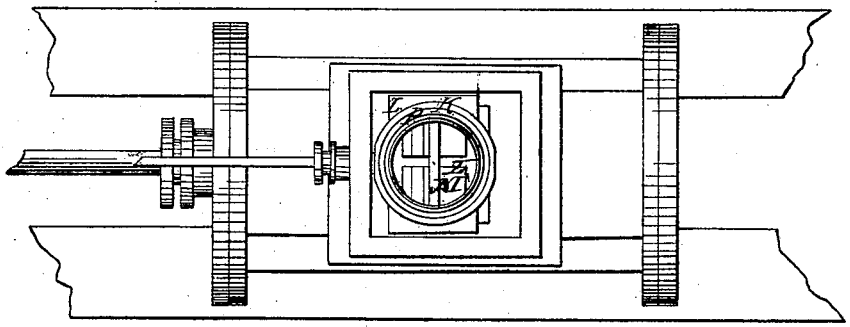
Fig. 2.
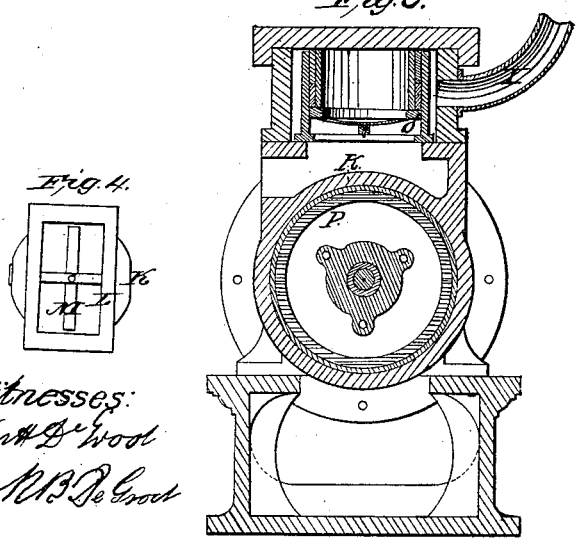
Fig. 3.
Fig. 4.
Witnesses:
Inventor:

UNITED STATES PATENT OFFICE.

ABNER W. JONES, OF BROOKLYN, NEW YORK, ASSIGNOR TO N. D. MORGAN, OF SAME PLACE.

IMPROVEMENT IN SLIDE-VALVES FOR STEAM-ENGINES.

Specification forming part of Letters Patent No. 51,656, dated December 19, 1865.

*To all whom it may concern:*

Be it known that I, ABNER W. JONES, of Brooklyn, in the county of Kings and State of New York, have invented certain Improvements in Slide-Valves for Steam-Engines, of which the following is a specification.

The nature and object of this invention are the means for diminishing the friction in the play of the valve, and in so constructing and arranging the several parts thereof that the pressure of the steam upon one part of the valve shall be neutralized or balanced by its pressure upon other parts, as hereinafter more fully described.

In the drawings, Figure 1 is a vertical longitudinal central section of the valve, valve-box, cylinder, &c. Fig. 2 is a top view of the valve, valve-box, cylinder, &c., the cover of the box being removed. Fig. 3 is a vertical transverse central section of the valve, valve-box, cylinder, &c. Fig. 4 is a bottom view of the valve.

A is the cylinder of a steam or gas or air engine, constructed in the usual manner. B is the piston; C, the piston-rod; D, the piston-rod stuffing-box; E, the cover. G is the valve-rod; I, the induction-pipe by which the steam is introduced into the valve-box, thence into the cylinder. J is the exhaust.

The valve consists of a small upright cylinder, K, securely attached to a frame, L, which frame L rests upon the valve-seat M.

The frame L and the bottom of the cylinder K are constructed as represented in Figs. 2 and 4, so as to equalize or balance the pressure of the steam, so that no more power is required to move the valve than sufficient to overcome the inertia of its weight and the slight pressure of the spring to keep the valve to its bearing. This spring rests upon and is secured at its center to the cross-bar N of the frame L, or a spiral spring or its equivalent may be used.

O is a flat ring fitted into the inside of the cylinder K and resting upon the ends of the spring M, as represented in Figs. 1 and 3.

P is a hollow cylinder fitted into the cylinder K, and in connection with the flat ring O, of an equal height therewith.

There may be substituted for the cylinder P a series of concentric cylinders breaking joints, and which may rest upon the ring O, as represented in Figs. 1 and 3, or upon the ends of the spring M.

The height of the cylinder K is such that it does not press against the cover E of the valve-box; but the cylinder P, by the elasticity of the spring M, is held up against the cover E. The cylinder P should be ground into the interior of the cylinder K, or it may be stuffed so as to be steam-tight.

The valve has been described as cylindrical in form; but this is not material. Any other form would answer, the cylinder form being a little easier of construction.

The advantages of this invention are its simplicity of construction and the pressure of the steam so nearly balanced as to nearly overcome the friction in moving the valve.

I claim—

The combination of the cylinder K and the cylinder P with the spring M, so constructed and arranged as to balance the pressure of the steam and hold the valve to its seat, substantially as herein described, and for the purpose set forth.

A. W. JONES.

Witnesses:
WM. P. SANDFORD,
G. W. ARNOLD.